United States Patent [19]
Fujiwara

[11] Patent Number: 5,955,814
[45] Date of Patent: *Sep. 21, 1999

[54] MOTOR HAVING A STATOR AND A ROTOR, THE STATOR HAVING A PLURALITY OF DIVIDED MEMBERS

[75] Inventor: Masakatsu Fujiwara, Kasai, Japan

[73] Assignee: Sanyo Electric Co., Ltd., Moriguchi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/636,800

[22] Filed: Apr. 23, 1996

[30] Foreign Application Priority Data

May 15, 1995 [JP] Japan ..................................... 7-115826

[51] Int. Cl.⁶ ................................................... H02K 1/12
[52] U.S. Cl. .......................... 310/258; 310/254; 310/259; 310/42; 310/179; 29/596; 29/598
[58] Field of Search .................................... 310/259, 179, 310/254, 258; 29/596, 598

[56] References Cited

U.S. PATENT DOCUMENTS

| | | | |
|---|---|---|---|
| 3,643,118 | 2/1972 | Ichiki et al. | 310/40 |
| 4,263,524 | 4/1981 | Diederichs | 310/112 |
| 4,612,702 | 9/1986 | Wheeler | 29/596 |
| 4,698,539 | 10/1987 | Workman | 310/216 |
| 5,045,742 | 9/1991 | Armstrong et al. | 310/254 |
| 5,182,848 | 2/1993 | Wheeler | 29/596 |
| 5,239,743 | 8/1993 | Santandrea | 29/596 |
| 5,402,028 | 3/1995 | Koeber et al. | 310/259 |
| 5,619,086 | 4/1997 | Steiner | 310/259 |
| 5,627,424 | 5/1997 | Steiner | 310/258 |

FOREIGN PATENT DOCUMENTS

| | | |
|---|---|---|
| 1002498 | 3/1991 | Belgium . |
| 0041000 | 12/1981 | European Pat. Off. . |
| 2033060 | 1/1972 | Germany . |
| 3208155A1 | 9/1983 | Germany . |
| 3842560A1 | 6/1990 | Germany . |
| 56-047224 | 4/1981 | Japan . |
| 58-036144 | 3/1983 | Japan . |

*Primary Examiner*—Elvin G. Enad
*Attorney, Agent, or Firm*—Armstrong, Westerman, Hattori, McLeland & Naughton

[57] ABSTRACT

A motor with a stator and a rotor in which the stator consists of a plurality of divided members. The motor comprises: a pair of magnetic pole cores having poles composing two mutually opposite sides of the stator and arms extending in both directions from the poles, the poles being wound with windings; and yoke cores arranged between mutually opposite arms of the magnetic pole cores formed at both ends of the yoke cores. The curved portions which are proximate to the arms of the above-mentioned magnetic pole cores are formed at both ends of the yoke cores. The dividing of the stator allows the workability to wind windings on the poles to be improved, and the blanking of the yoke cores within the width of the magnetic pole cores allows the yield of to be improved, whereby reducing the costs. A method of manufacturing the motor is also disclosed.

4 Claims, 18 Drawing Sheets

MOTOR HAVING A STATOR AND A ROTOR, THE STATOR HAVING A PLURALITY OF DIVIDED MEMBERS

BACKGROUND OF THE INVENTION

The present invention relates to a motor consisting of a plurality of divided members and a method of manufacturing the motor.

Heretofore, when a stator of a motor is manufactured, substantially rectangular stator members 61 having poles 60 at two mutually opposite sides on which windings are wound and rotor members 62 have been blanked in a sheet of steel plate in a state in which the stator members 61 and the rotor members 62 are arranged in the steel plate as shown in FIG. 18, and then the stator members 61 and the rotor members 62 have been individually laminated and fixed by the use of caulking technique and the like so as to form a stator and a rotor.

In that case, in order to blank a sheet of the rotor member 62 and a sheet of the stator member 61, it is necessary to use a material corresponding to the outside area of the stator member 61, and a portion 63 other than the stator member 61 and the rotor member 62 has been discarded, so that there has been a disadvantage of a large loss in material.

The present invention is made in view of the above-mentioned disadvantage, and intended to provide a motor capable of reducing the usage of material.

SUMMARY OF THE INVENTION

In accordance with the present invention, there is provided a motor with a stator and a rotor in which the stator consists of a plurality of divided members, comprising: a pair of magnetic pole cores having poles composing two mutually opposite sides of the stator and arms extending in both directions from the poles, the poles being wound with windings; and yoke cores arranged between mutually opposite arms of the magnetic pole cores, wherein curved portions which are proximate to the arms of the above-mentioned magnetic pole cores are formed at both the ends of the yoke cores.

There is further provided a motor with a stator and a rotor in which the stator consists of a plurality of divided members, comprising: a pair of magnetic pole cores having poles composing two mutually opposite sides of the stator, the poles being wound with windings; a pair of yoke cores longer than the magnetic pole cores; and link cores interposed between the magnetic pole core and yoke core.

In the present invention, there is still further provided a motor with a stator and a rotor in which the stator consists of a plurality of divided members, comprising: a pair of magnetic pole cores having poles composing two mutually opposite sides of the stator and arms extending in both directions from the poles, the poles being wound with windings; yoke cores arranged between mutually opposite arms of the magnetic pole cores; and joint cores interposed between both end faces of the magnetic pole core and yoke core when a part of the yoke core is connectively disposed on the pole side of the end of the magnetic pole core.

There is also provided a motor with a stator and a rotor, in which the stator consists of a plurality of divided members, comprising: a pair of approximately U-shaped yoke cores composing the stator, and magnetic pole cores connected between inner sides of the end of the yoke cores.

In accordance with the present invention, there is provided a method of manufacturing a motor with a stator consisting of a plurality of divided members and a rotor, comprising the steps of:

a) arranging a pair of first members having poles which compose two mutually opposite sides of the stator, the poles being wound with windings, and arms extending in both directions from the poles with the poles being opposite to each other; arranging rotor members between the mutually opposite poles of the first members; arranging second members between mutually opposite arms of the first members on the side of poles in such a state that the second members are rotated by 90 degrees from the first members, and are proximate to the rotor members; and blanking these members in a sheet of material;

b) laminating the rotor members to form the rotor;

c) laminating the first members to form magnetic pole cores;

d) laminating the second members to form yoke cores;

e) winding windings on the rotor;

f) winding windings on the poles of the magnetic pole cores; and g) fixing the yoke cores to the arm end of the magnetic pole cores.

There is further provided the second method of manufacturing a motor with a stator consisting of a plurality of divided members and a rotor, comprising the steps of:

a) arranging a pair of first members having poles which compose two mutually opposite sides of the stator with the poles being opposite to each other, the poles being wound with windings; arranging rotor members between the mutually opposite poles of the first members; arranging second members between ends of the first members in such a state that the second members are rotated by 90 degrees from the first members, and are proximate to the rotor members; and blanking these members in a sheet of material;

b) blanking third members interposed between the first member and the second member;

c) laminating the rotor members to form the rotor;

d) laminating the first members to form magnetic pole cores;

e) laminating the second members to form yoke cores;

f) laminating the third members to form link cores;

g) winding windings on the rotor;

h) winding windings on the poles of the magnetic pole cores; and i) allowing the link cores to be interposed between the magnetic pole core and the yoke core and fixing the link cores.

In accordance with the present invention, there is provided the third method of manufacturing a motor with a stator consisting of a plurality of divided members and a rotor, comprising the steps of:

a) arranging a pair of first members having poles which compose two mutually opposite sides of the stator with the poles being opposite to each other, the poles being wound with windings; arranging rotor members between the mutually opposite poles of the first members; arranging second members between ends of the first members in such a state that the second members are rotated by 90 degrees from the first members and are proximate to the rotor members; arranging third members between the pole of the first members and the second members; and blanking these members in a sheet of material;

b) laminating the rotor members to form the rotor;

c) laminating the first members to form magnetic pole cores;

d) laminating the second members to form yoke cores;

e) laminating the third members to form link cores;

f) winding windings on the rotor;

g) winding windings on the poles of the magnetic pole cores; and h) allowing the link cores to be interposed between the magnetic pole core and the yoke core and fixing the link cores.

There is also provided the fourth method of manufacturing a motor with a stator consisting of a plurality of divided members and a rotor, comprising the steps of:

a) arranging a pair of first members having poles which compose two mutually opposite sides of the stator, the poles being wound with windings, and arms extending in both directions from the poles with the poles being opposite to each other; arranging rotor members between the mutually opposite poles of the first members; arranging second members between mutually opposite arms of the first member on the side of poles in such a state that the second members are rotated by 90 degrees from the first members, and are proximate to the rotor members; and blanking these members in a sheet of material;

b) blanking third members arranged between the end face of the first members and that of the second members with a part of the first members being joined to a part of the second members;

c) laminating the rotor members to form the rotor;

d) laminating the first members to form magnetic pole cores;

e) laminating the second members to form yoke cores;

f) laminating the third members to form joint cores;

g) winding windings on the rotor;

h) winding windings on the poles of the magnetic pole cores;

i) connectedly fixing a part of the yoke cores to the end of the arm of the magnetic pole cores; and j) fixing the joint core between the end face of the magnetic pole core and that of the yoke core.

In accordance with the present invention, there is further provided the fifth method of manufacturing a motor with a stator consisting of a plurality of divided members and a rotor, comprising the steps of:

a) arranging a pair of first members having poles which compose two mutually opposite sides of the stator with the poles being opposite to each other, the poles being wound with windings; arranging rotor members between the mutually opposite poles of the first members; arranging second members between ends of the first members in such a state that the second members are rotated by 90 degrees from the and are proximate to the rotor members; arranging third members between the pole of the first members and the second members; and blanking these members in a sheet of material;

b) laminating the rotor members to form the rotor;

c) laminating the first members to form magnetic pole cores;

d) laminating the second members to form yoke cores;

e) laminating the third members to form link cores;

f) winding windings on the rotor;

g) winding windings on the poles of the magnetic pole cores;

h) connectedly fixing a part of the yoke cores to the end of the arm of the magnetic pole cores; and i) fixing the joint core between the end face of the magnetic pole core and the end face of the yoke core.

There is further provided the sixth method of manufacturing a motor with a stator consisting of a plurality of divided members and a rotor, comprising the steps of:

a) arranging a pair of U-shaped yoke members with the ends thereof proximate to each other; arranging magnetic pole members inside the yoke members in such a state that the magnetic pole members bridge the ends of the yoke members; arranging rotor members between the magnetic pole members; and blanking these members in a sheet of material;

b) laminating the rotor members to form the rotor;

c) laminating the yoke members to form yoke cores;

d) laminating the magnetic pole members to form magnetic pole cores;

e) connectedly fixing a part of the yoke cores to both the ends of magnetic pole cores; and f) winding windings on the magnetic pole cores.

According to the constitution of claim 1 of the present invention, the dividing of the stator allows the workability to wind windings on the poles to be improved, and the blanking of the yoke cores between the arms of the magnetic pole cores allows the yield of material to be improved. The forming of curve portions at both ends of the yoke cores allows a distance between the magnetic pole/yoke core and the rotor to be secured when the yoke core is connected to the end of the magnetic pole core even when the width of the magnetic pole core is made narrow, and thus a leakage in magnetic flux from the rotor to the yoke core to be prevented, thereby further improving the yield of material.

According to the constitution of claim 2 of the present invention, the dividing of the stator allows the workability to wind windings on the poles to be improved, and the stator can be formed by connecting the magnetic pole core through the link core to the yoke core which is longer than the magnetic pole core thereby improving the yield of the stator material.

According to the constitution of claim 3 of the present invention, the dividing of the stator allows the workability to wind windings on the poles to be improved, and the stator can be formed by connecting the yoke core, which is formed by being blanked in a material between the arms of the magnetic pole core, to the end of the arm and connecting the joint core between the end face of the magnetic pole core and that of the yoke core thereby improving the yield of material.

According to the constitution of claim 4 of the present invention, the stator can be formed by blanking the magnetic pole cores in a state in which the magnetic pole core is disposed inside the U-shaped yoke core of which ends are made proximate to each other and bridges the ends of the yoke core, and by moving of the yoke core toward the end of the magnetic pole core to connect, thereby improving the yield of material.

According to the first manufacturing method of the present invention, the dividing of the stator allows the workability to wind windings on the poles to be improved, and the stator can be formed by connecting the yoke core, which is formed by being blanked in a material between the arms of the magnetic pole core, to the end of the arm, thereby improving the yield of material.

According to the second manufacturing method of the present invention, the dividing of the stator allows the workability to wind windings on the poles to be improved, and the stator can be formed by connecting the magnetic pole core through the link core to the yoke core which is longer than the magnetic pole core, thereby improving the yield of the stator material.

According to the third manufacturing method of the present invention, the dividing of the stator allows the workability to wind windings on the poles to be improved, the stator can be formed by connecting the magnetic pole core through the link core to the yoke core which is longer than the magnetic pole core, and the blanking of the link members forming the link cores between the first member forming the magnetic pole core and the second member forming the yoke core allows the yield of the stator material to be further improved.

According to the fourth manufacturing method of the present invention, the dividing of the stator allows the workability to wind windings on the poles to be improved, and the stator can be formed by connecting the yoke core, which is formed by being blanked in a material between the arms of the magnetic pole core, to the end of the arm, by connecting the joint core between the end face of the magnetic pole core and that of the yoke core allows the stator to be formed, thereby improving the yield of material.

According to the fifth manufacturing method of the present invention, the dividing of the stator allows the workability to wind windings on the poles to be improved, and the stator can be formed by connecting the yoke core, which is formed by being blanked in a material between the arms of the magnetic pole core, to the end of the arm, and by connecting the joint core between the end face of the magnetic pole core and that of the yoke core, thereby improving the yield of material. Further, the blanking of the third members forming the joint cores between the first member forming the magnetic pole core and the second member forming the yoke core allows the yield of material to be further improved.

According to the sixth manufacturing method of the present invention, the stator can be formed by blanking respective members in a sheet of material in a state in which the ends of a pair of U-shaped yoke core and made proximate to each other and the magnetic pole core is disposed inside the yoke core with bridging the ends of the yoke core, and in which the rotor member is disposed between the magnetic pole members, by laminating these members respectively to form the yoke core, the magnetic pole core and the rotor, and by moving the yoke core to both ends of the magnetic pole core to connect, thereby improving the yield of material.

DETAILED DESCRIPTION

With reference to a motor-driven fan shown in FIGS. 1 to 4, and 17 a first embodiment of the present invention will be explained.

Figure 17:
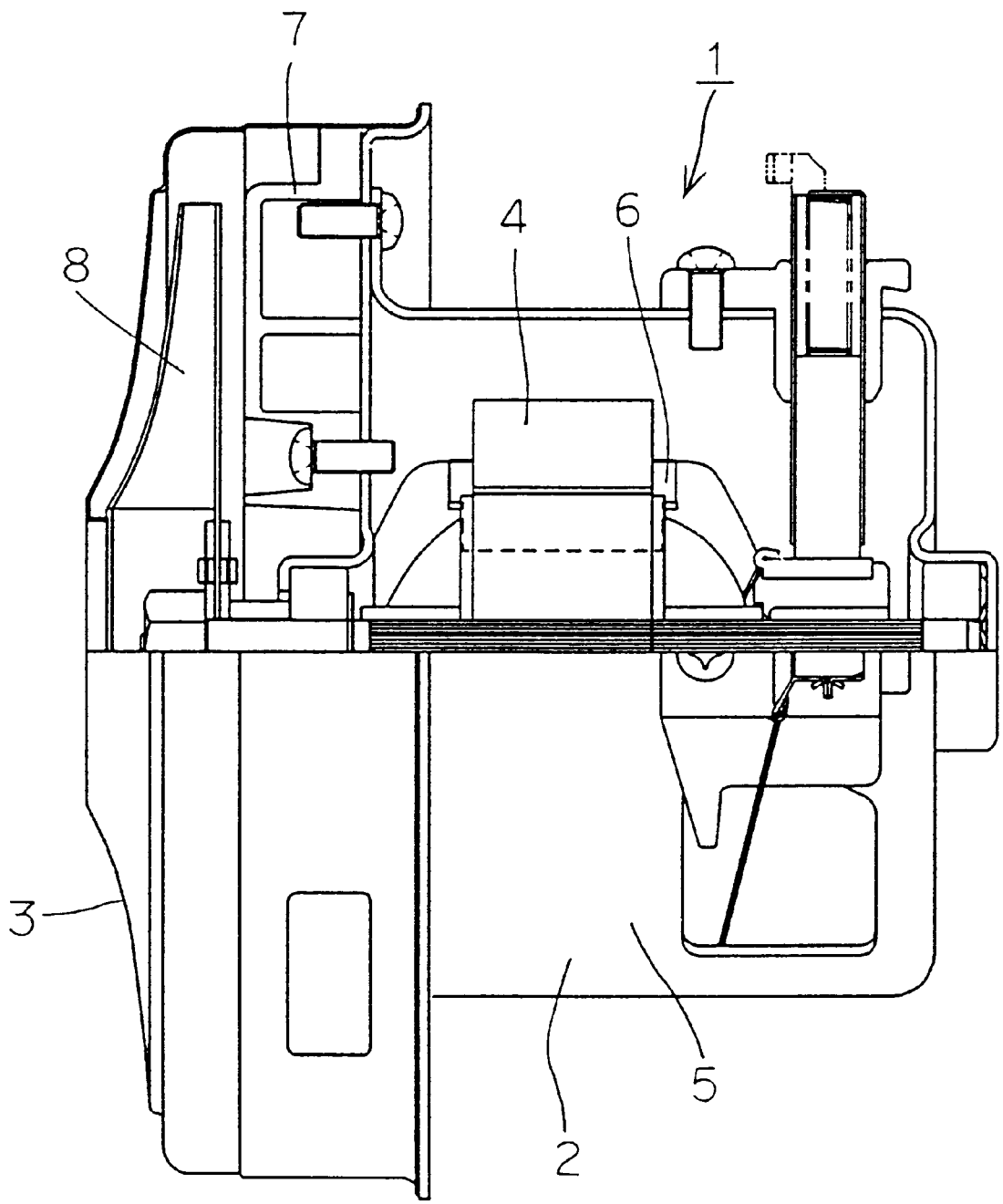
FIG. 17 is a partially broken view of the motor.
Figure 18:
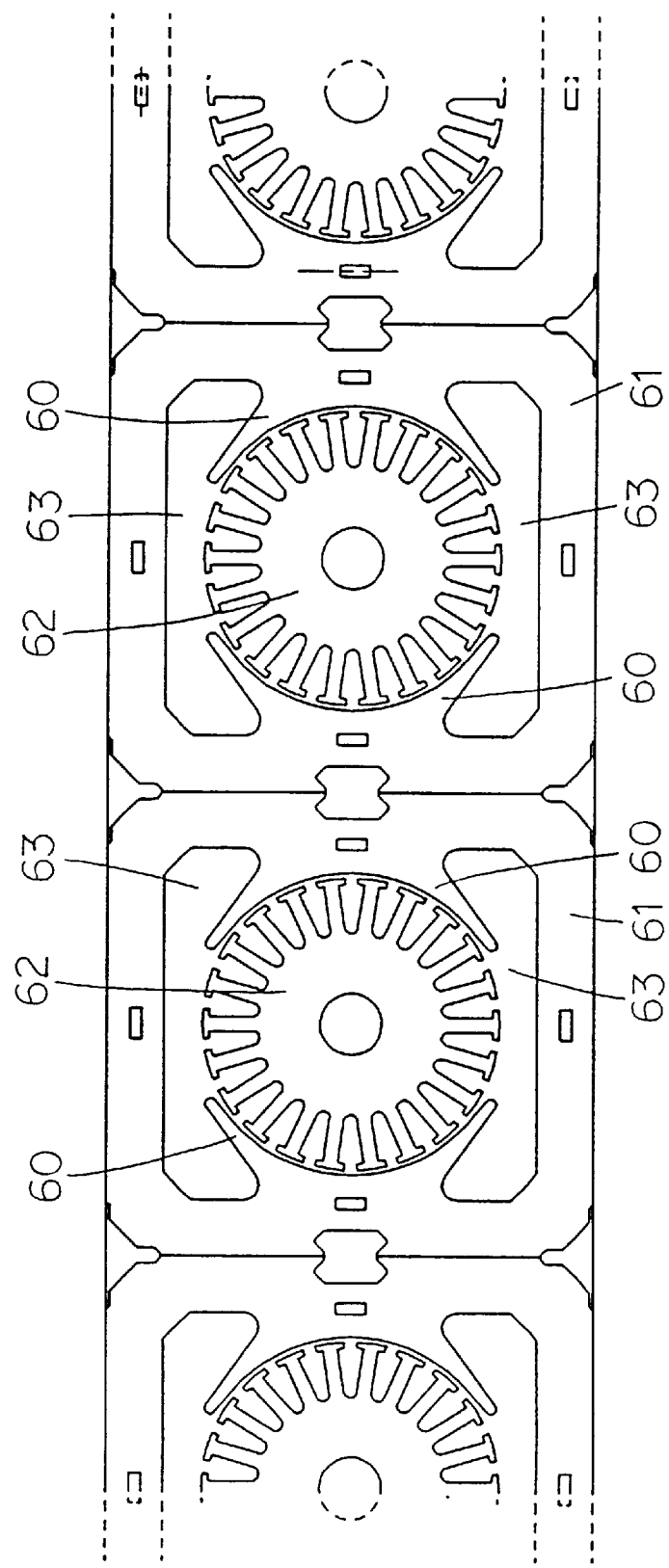
FIG. 18 is a view showing a press process of a stator and rotor material according to a prior art.

In FIG. 17, reference numeral 1 designates a motor-driven fan comprising of a motor unit 2 and a fan unit 3, and the motor unit 2 is equipped with a blacket 5 for press fitting fixedly a stator 4 and a rotor 6 which is supported rotatably by the blacket 5 to rotate in the stator 4. The fan unit 3 has a diffuser 7 and a fan 8.

Figure 1:
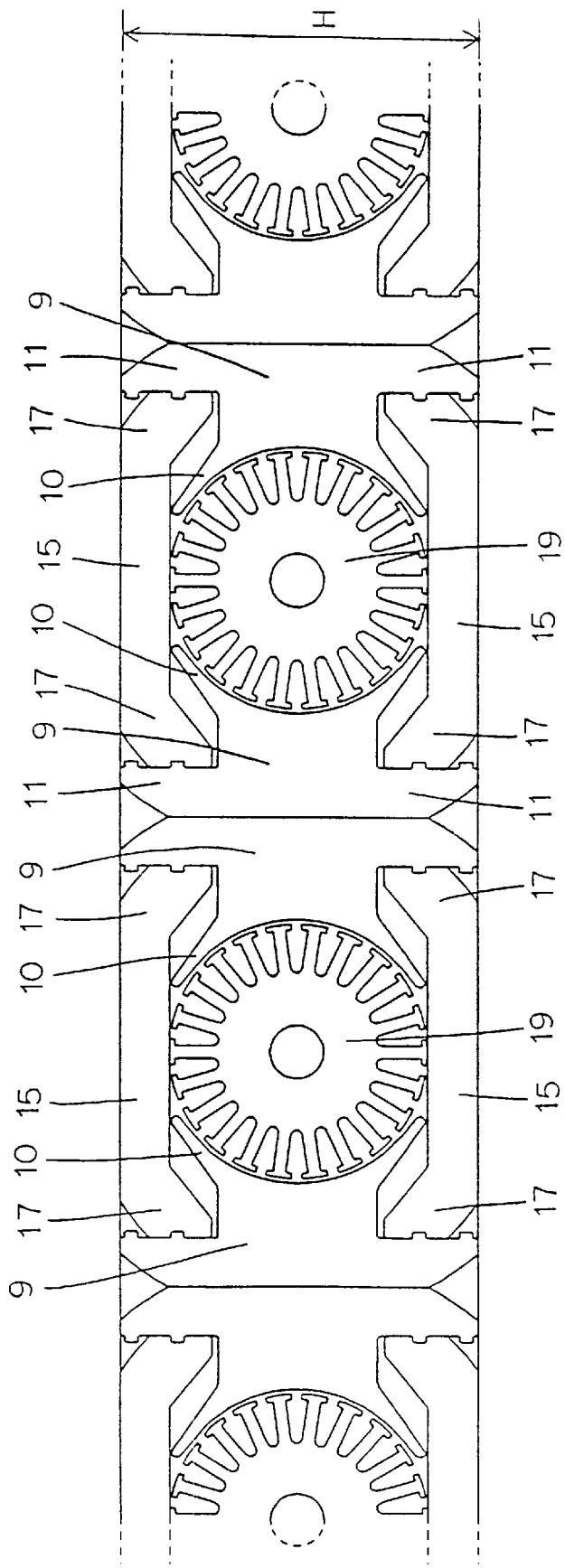
FIG. 1 is a view showing a press process of a stator and rotor material according to a first embodiment of the present invention.
Figure 2:
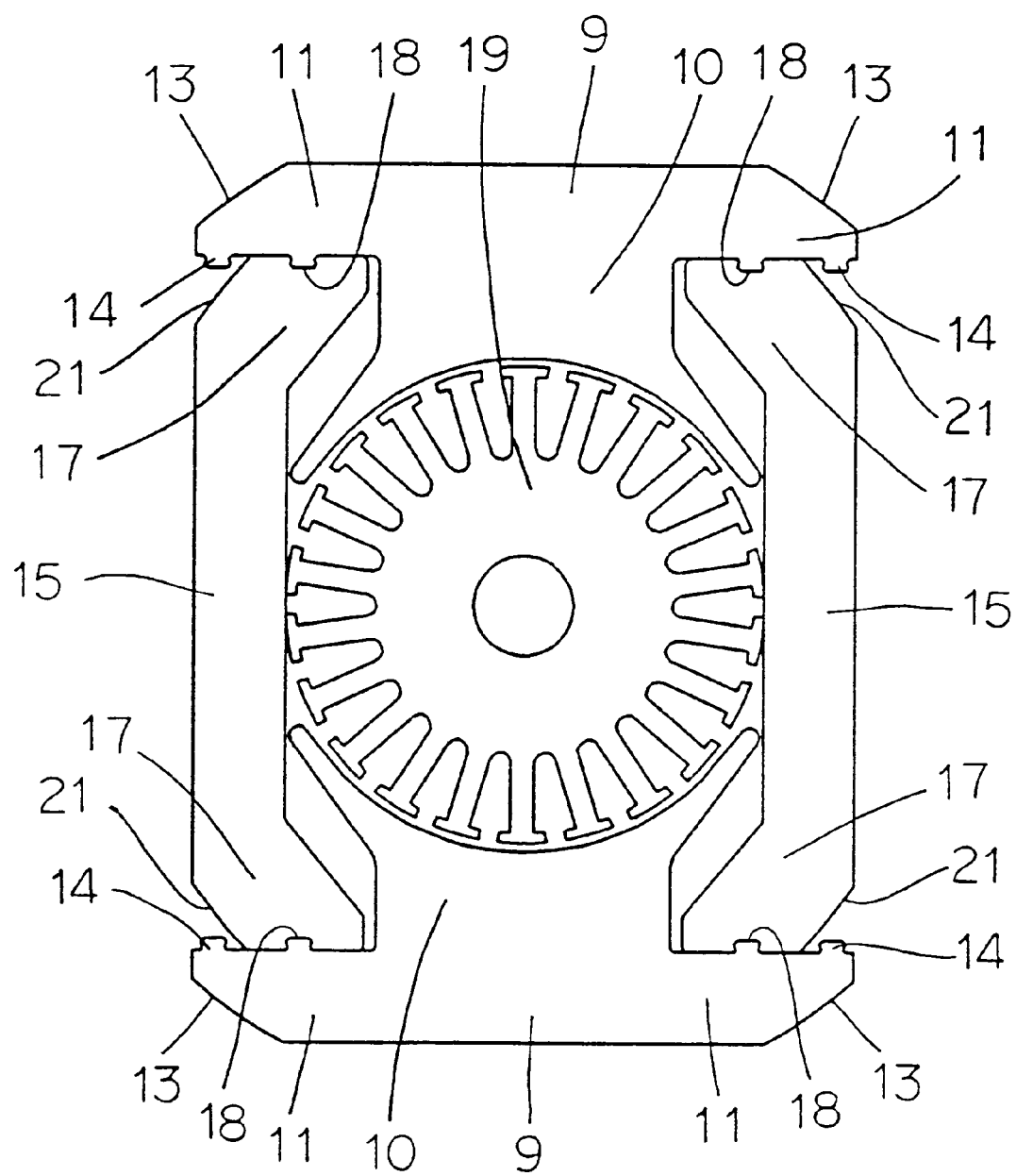
FIG. 2 is an enlarged view of a stator and rotor composing material in the press process of FIG. 1.
Figure 3:
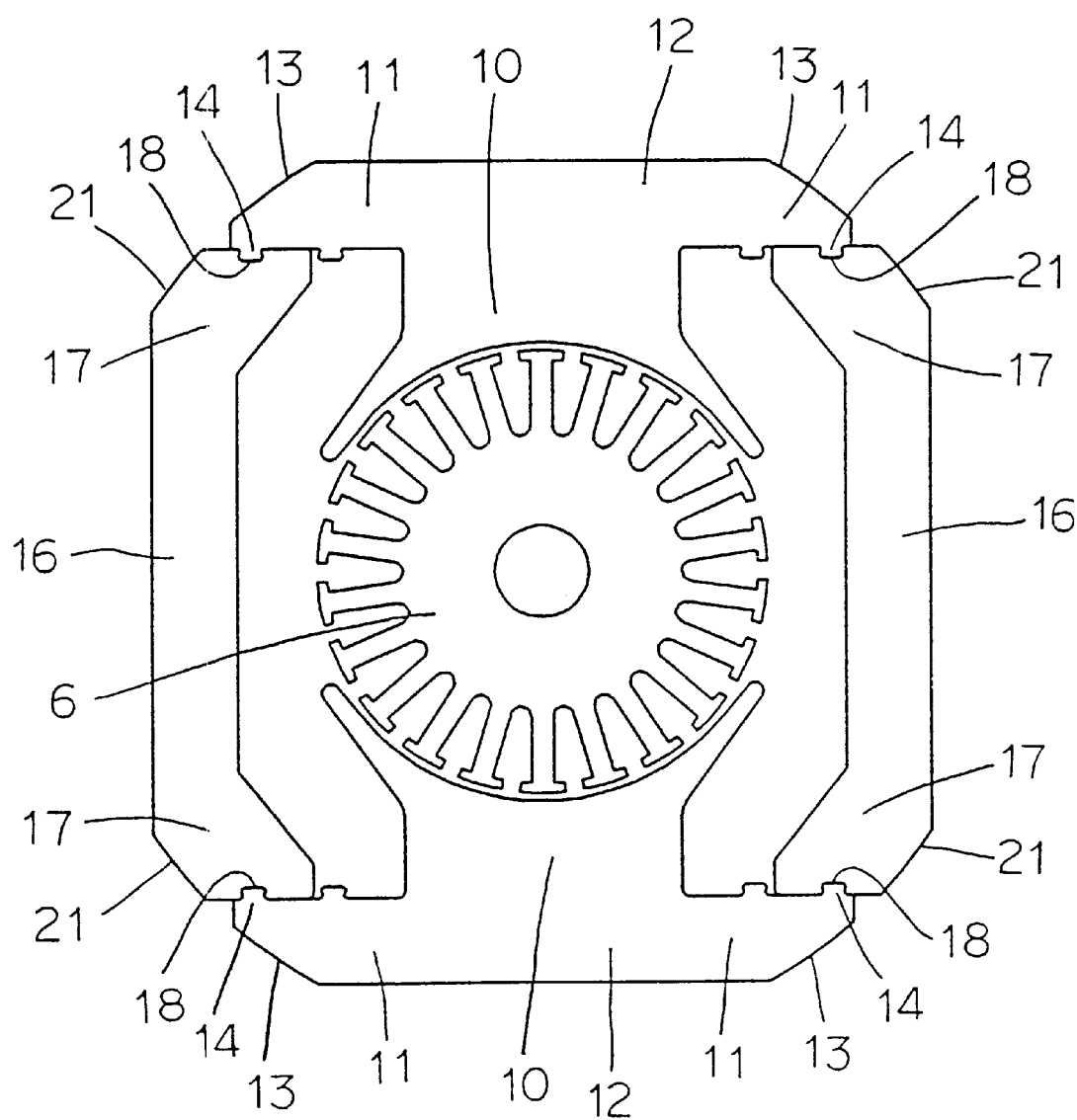
FIG. 3 is a sectional view showing a state in which the stator and the rotor are assembled.
Figure 4:
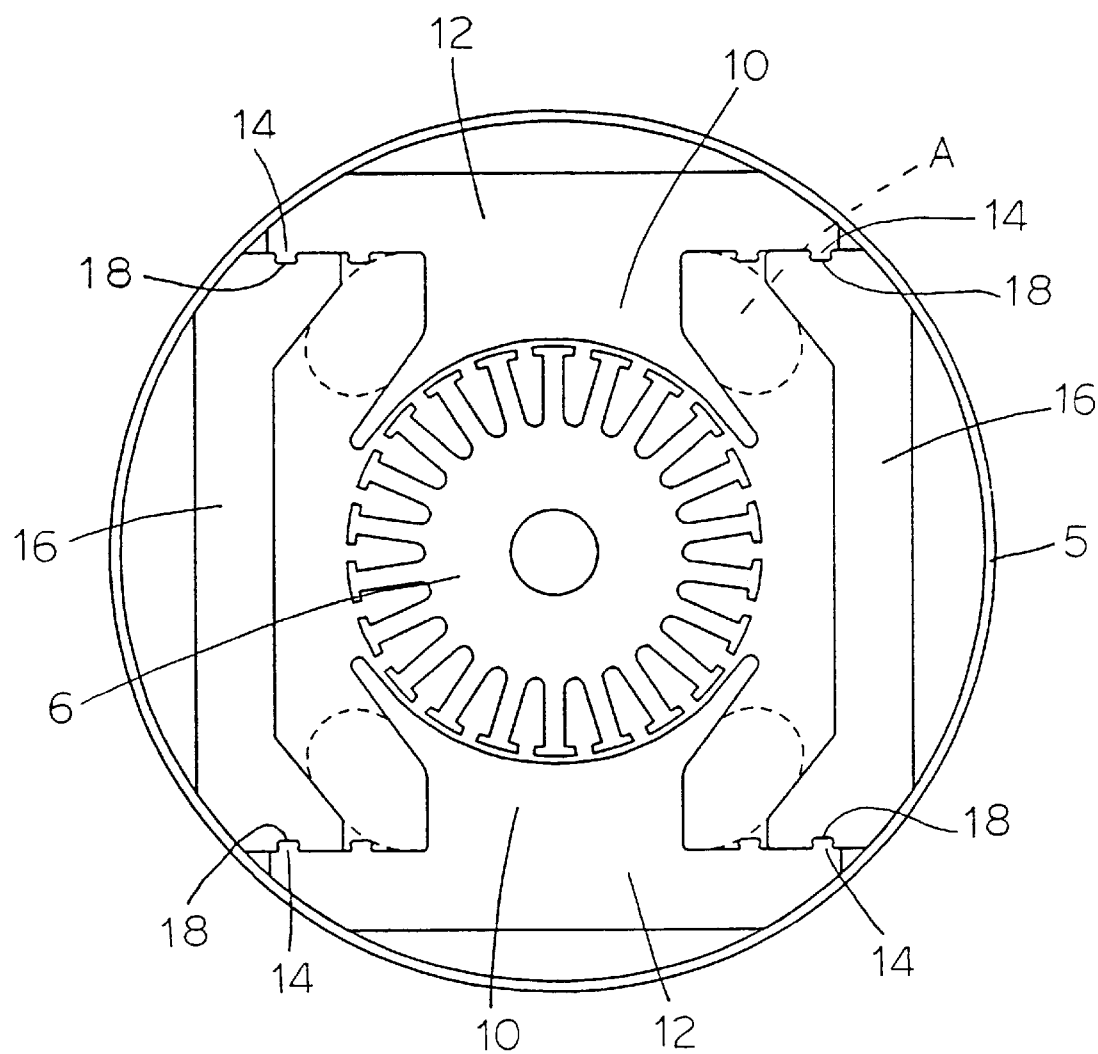
FIG. 4 is a sectional view showing a state in which the stator and the rotor are press fitted into a bracket.
Figure 5:
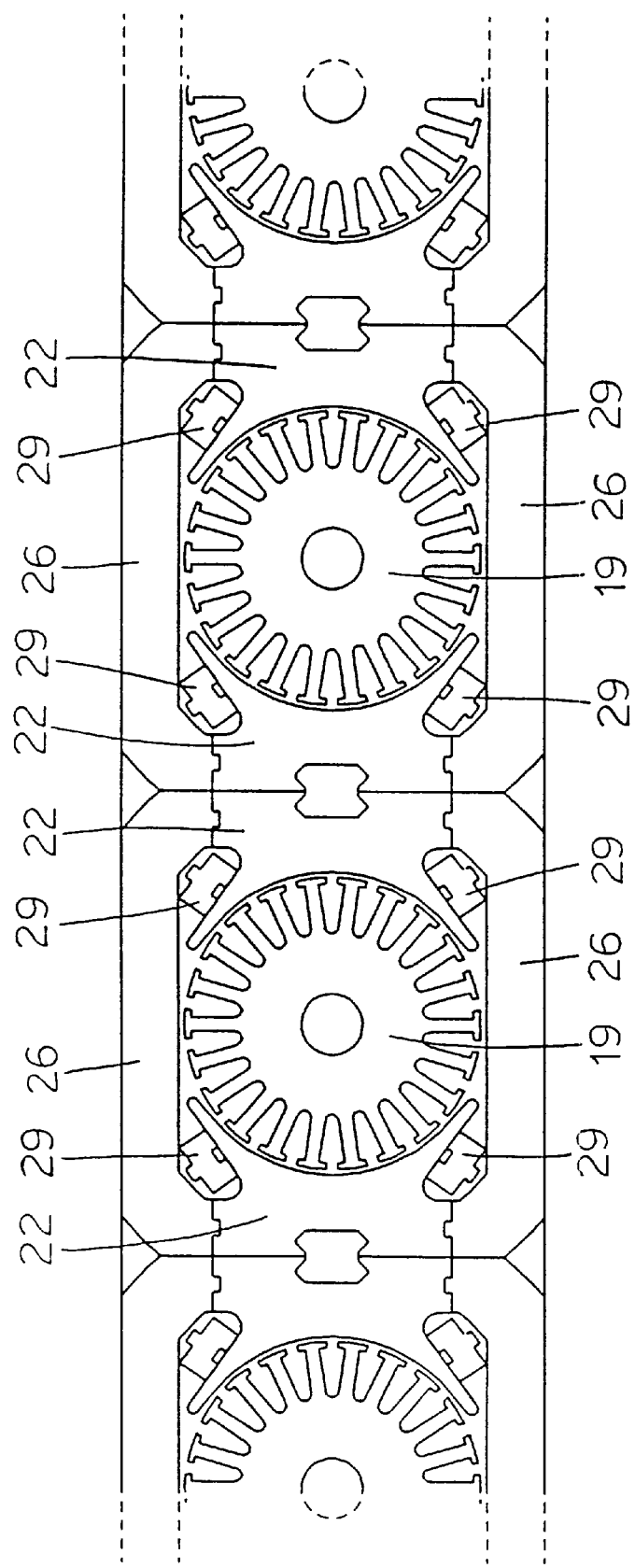
FIG. 5 is a view showing a press process of a stator and rotor material according to a second embodiment of the present invention.

Next explanation will be given with reference to FIGS. 1 and 2 showing a positional relationship when the stator 4 and the rotor 6 are blanked in a material.

Reference numeral 9 designates a magnetic pole member as a first member forming magnetic poles 10 on which windings A are wound, the magnetic pole member 9 being formed with arms 11, 11 extending in both directions of the magnetic poles 10. A magnetic pole core 12 (refer to FIG. 3) is formed by laminating and fixing the laminated magnetic pole members 9 by the use of caulking technique and the like. Reference numeral 13 designates inclined face formed at the outer end corner of the arm 11, and reference numeral 14 designates an engaging projection formed on the magnetic pole 10 side of the arms 11.

Reference numeral 15 designates a yoke member as a second member linked between the mutually opposite magnetic pole members 9, 9 on the magnetic pole 10 side. A yoke core 16 (refer to FIG. 3) fixed to the magnetic pole core 12 is formed by laminating and fixing the yoke members 15 by the use of caulking technique and the like, and the stator 4 is composed of the magnetic pole core 12 and yoke core 16.

Reference numeral 17 designates curve portions which are formed at both ends of the yoke member 15 and which are proximate to the magnetic poles 10. Formed on the end face of the curve portions 17 is an engaging portion 18 with which the engaging projection 14 of the magnetic pole members 9 engages.

Reference numeral 19 designates a rotor member arranged between the mutually opposite magnetic poles 10 of the magnetic pole members 9. The rotor 6 is formed by laminating and fixing the rotor members 19 by the use of caulking technique and the like, and windings are wound on the rotor 6.

Respective members are blanked in a sheet of steel plate in a state in which, as shown in FIGS. 1 to 2, the magnetic poles 10, 10 of the magnetic pole members 9, 9 are opposite to each other; the rotor member 19 is arranged between the magnetic poles 10, 10; and the yoke members 15, 15 are rotated by 90 degrees from the magnetic pole members 9, 9 with the rotor member 19 as a center, and arranged between the mutually opposite arms 11, 11 of the magnetic pole members 9, 9 and at positions proximate to the rotor members 19. In that arrangement, the yoke members 15, 15 are located within a width H of the magnetic pole member 9.

The magnetic pole core 12, the yoke core 6 and the rotor 16 are formed by laminating and fixing the magnetic pole members 9, the yoke core members 15 and the rotor members 19 by the use of caulking technique and the like, respectively; and windings are wound on the magnetic poles 10 of the magnetic pole core 12 and on the rotor 6. The stator 4 is obtained by press fitting the engaging portion 18 of the yoke core 16 into the engaging projection 18 formed in the magnetic pole core 12 to fix the magnetic pole core 12 and the yoke core 16, and then the obtained stator 4 is press fitted into the bracket 5. In a state in which the pole core 12 and yoke core 16 are connected to each other, the inclined face 13 of the magnetic pole core 12 is adapted to be substantially continuous with an outer inclined portion 21 of the curve portion 16 of the yoke core 16; and the inclined face 13 and the outer inclined portion 21 abut against the inner face of the bracket 5.

According to this constitution and assembling method, the dividing of the stator 4 into the magnetic pole core 12 and the yoke core 16 allows the workability to wind the windings A on the magnetic poles 10 to be improved.

Formed at both ends of the yoke members 15 forming the yoke core 16 are the curve portions 17 in the direction approaching the magnetic poles 10 of the magnetic pole members (magnetic pole core) 9, 9, so that in blanking respective members in steel plate, when the rotor member 19 and the yoke members 15, 15 are arranged within the width H of the magnetic pole member 9, the yoke members 15 are arranged in such a manner as to surround the rotor member 19 and the magnetic poles 10. For this reason, portions (corresponding to portions 63 of prior art) which heretofore have been discarded in the constitution of undivided stator can be effectively used to form the component members of the stator, thereby improving the yield of material.

Further, in blanking component material for the stator 4 and the rotor 6 in a steel plate, the stator 4 can be formed by arranging all the component material within the width H of the magnetic pole member 9, and moving laminated members for the stator 4, that is, the magnetic pole core 12 and the yoke core 16 toward the end of the arm 11 of the magnetic pole member 9 to be connected to each other. This allows a distance between the body portion of the magnetic core 16 and the rotor 20 to be secured when the yoke cores 16 are connected to the magnetic pole cores 12 while the blanking area in material is made small, and thus a leakage in magnetic flux from the rotor 6 to the body portion of the yoke core 16 when the motor is driven to be prevented.

Then, with respect to FIGS. 5 through 8, a second embodiment of the present invention will be explained. The same parts as those of the above-mentioned first embodiment are designated by the same reference numerals, and thus the explanation thereof will be omitted.

Reference numeral 22 designates a magnetic pole member as a first member having a magnetic pole 23 on which windings are wound. Formed on both the sides of the magnetic pole member 22 are recesses 24, and a magnetic pole core 25 is formed by laminating and fixing the magnetic pole members 22 by the use of caulking technique and the like.

Reference numeral 26 designates a substantially U-shaped yoke member as a second member, and a yoke core 27 is formed by laminating and fixing the yoke members 26 by the use of caulking technique and the like. Formed on both ends (faces joined with the magnetic pole cores 25) of the yoke core 27 are engaging projections 28.

Reference numeral 29 designates a link member as a third member blanked between the magnetic pole 23 of the magnetic pole member 22 and the yoke member 26. A link core 30 is formed by laminating and fixing the link members 29 by the use of caulking technique and the like, and interposed between the magnetic pole core 25 and yoke core 27 to connect them. The link member 29 is formed with an engaging projection 31 and a recess 32 on two mutually opposite sides. The engaging projection 31 and recess 32 are formed into the same shape and dimensions as those of the recess 24 of the magnetic pole member 22 and the engaging projection 28 of the yoke member 26, respectively.

Figure 6:
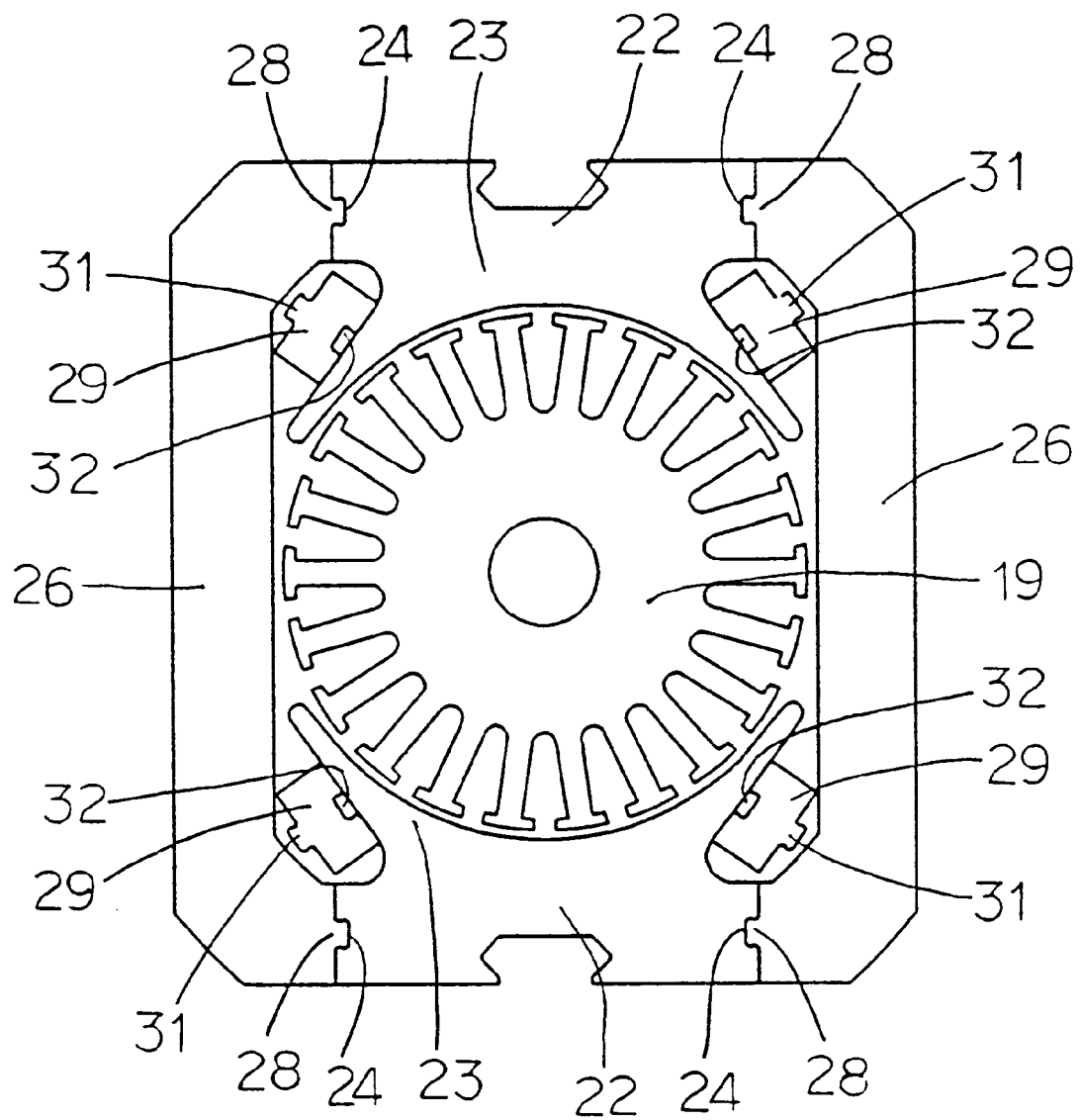
FIG. 6 is an enlarged view of a stator and rotor composing material in the press process of FIG. 5.
Figure 7:
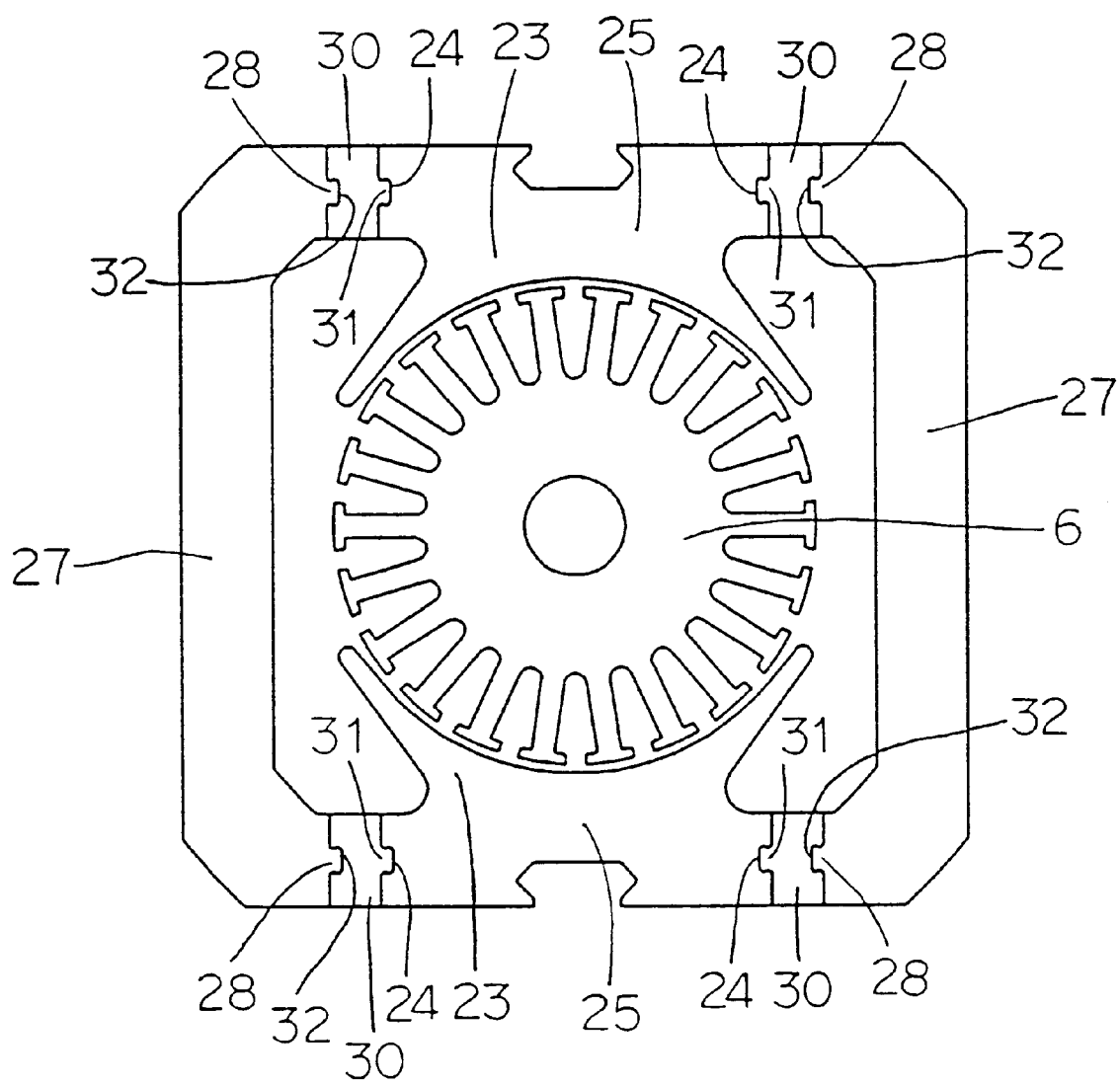
FIG. 7 is a sectional view showing a state in which the stator and the rotor are assembled.
Figure 8:
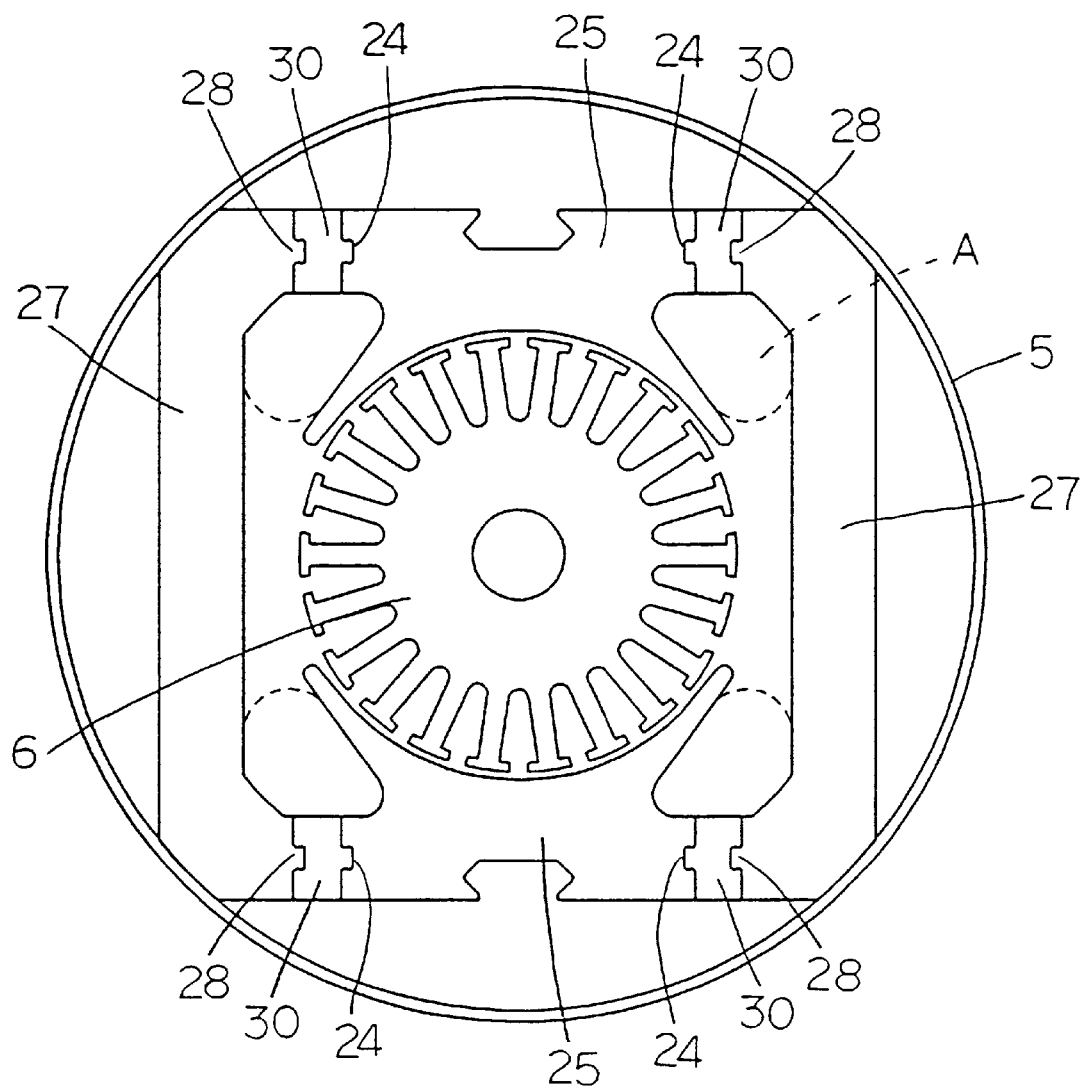
FIG. 8 is a sectional view showing a state in which the stator and the rotor are press fitted into a bracket.

Respective members are blanked in a sheet of steel plate in a state in which, as shown in FIG. 6, the magnetic poles 23, 23 of the magnetic pole members 22, 22 are opposite to each other; the rotor member 19 is arranged between the magnetic poles 23, 23; the substantially U-shaped yoke members 26, 26 are rotated by 90 degrees from the magnetic pole members 22, 22 with the rotor member 19 as a center, and arranged in connected relationship with the ends of the magnetic pole members 22, 22; and the rotor member 19 is arranged between the mutually opposite magnetic poles 23, 23 of the magnetic pole members 22, 22 and in an area surrounded by the magnetic pole members 22, 22 and the yoke members 26, 26; and at the same time, the link member 29 is blanked between the magnetic pole 23 of the magnetic pole member 22 and the yoke member 26.

The magnetic pole core 25, the yoke core 27, the link core 30 and the rotor 6 are formed by laminating and fixing the magnetic pole members 22, the yoke core members 26, the link members 29 and the rotor members 19 by the use of caulking technique and the like, respectively. At this stage, windings are wound on the magnetic poles 23 of the magnetic pole core 25 and on the rotor 6; respectively the engaging projection 31 of the link core 30 is press fitted into the recess 24 of the magnetic pole core 25, and the engaging projection 28 of the yoke core 27 is press fitted into the recess 32 of the link core 30. Then, the magnetic pole core 25 is fixed through the link core 30 to the yoke core 27 to form the stator 4; and thus obtained stator 4 is press fitted into the bracket 5.

According to this constitution and assembling method, in blanking the component members for the stator 4 and the rotor 6 in steel plate, portions (corresponding to portions 63 of prior art) which heretofore have been discarded when stator material is blanked, that is, portions between rotor member and stator member can be effectively utilized to improve the yield of material, and at the same time, the divining of the stator allows the workability to wind windings on the magnetic poles 23 to be improved.

Although in the second embodiment, the link members 29 as the third members are blanked in the same material as the rotor and stator, the link members 29 might be blanked in another material. Further it might be formed by a lower-magnetic reluctance material, for example, ferrite and the like.

Further, with reference to FIGS. 9 to 12, a third embodiment of the present invention will be explained. The same parts as those of the first embodiment are designated by the same reference numerals, and thus the explanation thereof will be omitted.

Reference numeral 33 designates a magnetic pole member as a first member forming a magnetic pole 34 on which windings are wound. Provided on both sides of the magnetic pole 34 are arms 35, and a magnetic pole core 36 is formed by laminating and fixing the magnetic pole members 33 by the use of caulking technique and the like. Reference numeral 37 designates a recess formed on the magnetic pole 34 side of the arm 35, and an engaging projection 41 of a later-described yoke core 40 is press fitted into the recess 37. Reference numeral 38 designates recesses formed on both sides of the arm 35, and a projection 44 of a later-described yoke core 43 is press fitted into the recess 38.

Reference numeral 39 designates a yoke member as a second member arranged substantially perpendicular to and between the arms 35 of the magnetic pole members 33. The yoke core 40 is formed by laminating and fixing the yoke members 39 by the use of caulking technique and the like, two engaging projections 41 are formed at both ends of the yoke member 39.

Reference numeral 42 designates an approximately triangular joint member as a third member blanked between the magnetic pole 34 and the yoke member 39. A joint core 43 is formed by laminating and fixing the joint members 42 by the use of caulking technique and the like, and when the magnetic pole core 36 and the yoke core 40 are connected with each other, the joint core 43 is arranged between the end face of the magnetic pole core 36 and that of the yoke core 40.

The joint member 42 is formed on its two sides perpendicular to each other with a projection 44 for engaging with the recess 38 formed at the end of the arm 35 of the magnetic pole core 36 and a recess 45 for engaging with the engaging projection 41 formed outside the yoke core 40. The projection 44 is formed into the same shape and dimensions as those of the recess 38 of the magnetic pole member 36, while the recess 45 is formed into the same shape and dimensions as those of the engaging projection 41 of the yoke core member 39.

Figure 9:
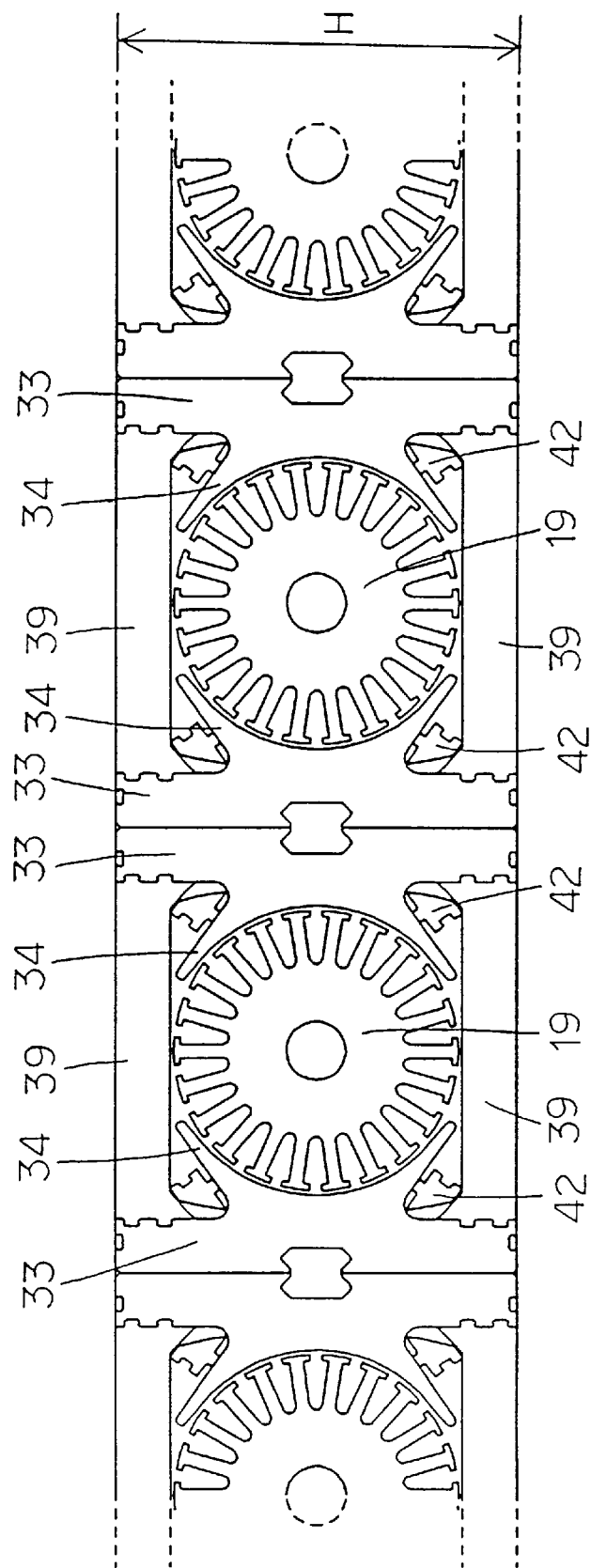
FIG. 9 is a view showing a press process of a stator and rotor material according to a third embodiment of the present invention.
Figure 10:
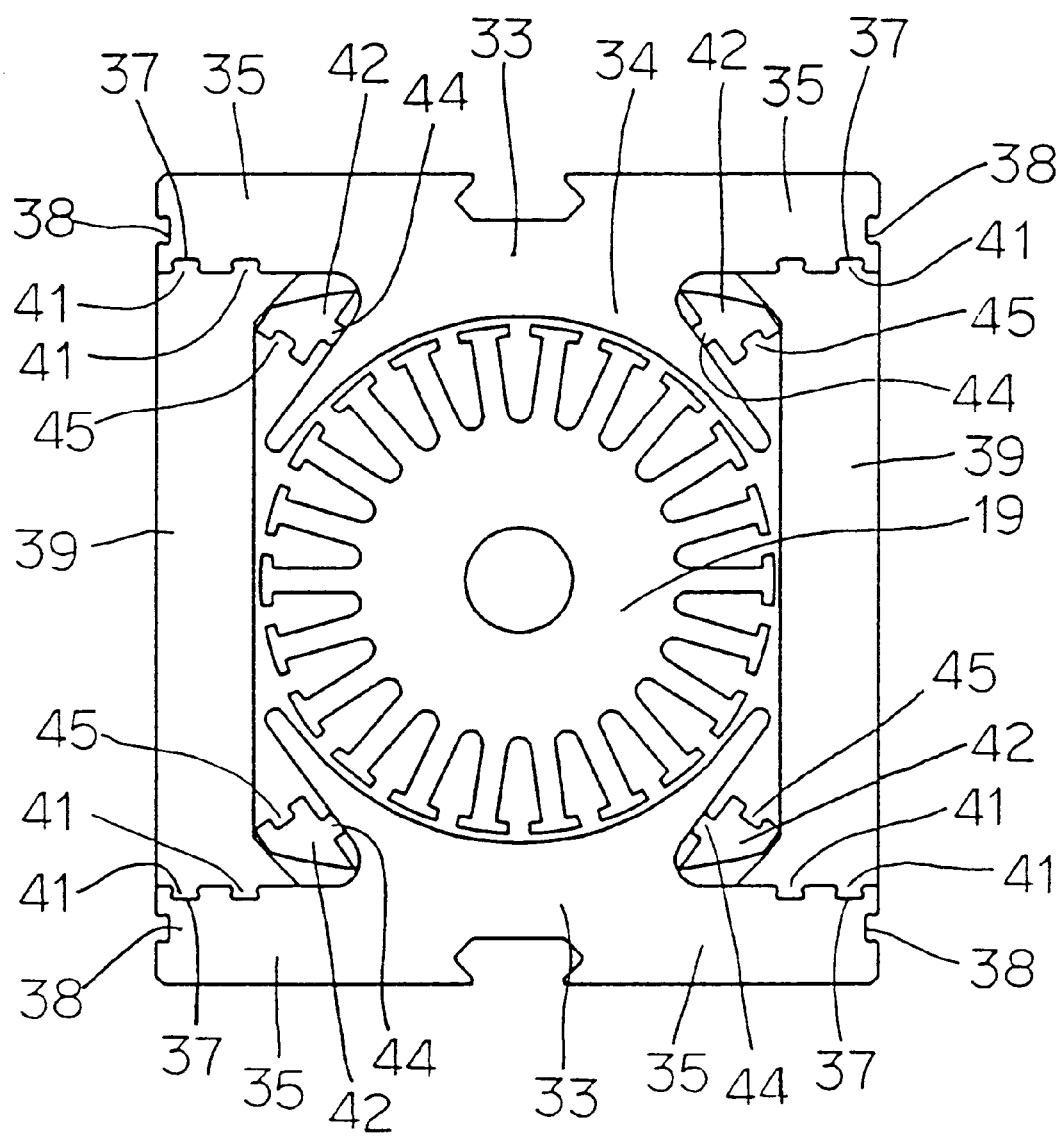
FIG. 10 is an enlarged view of a stator and rotor composing material in the press process of FIG. 9.
Figure 11:
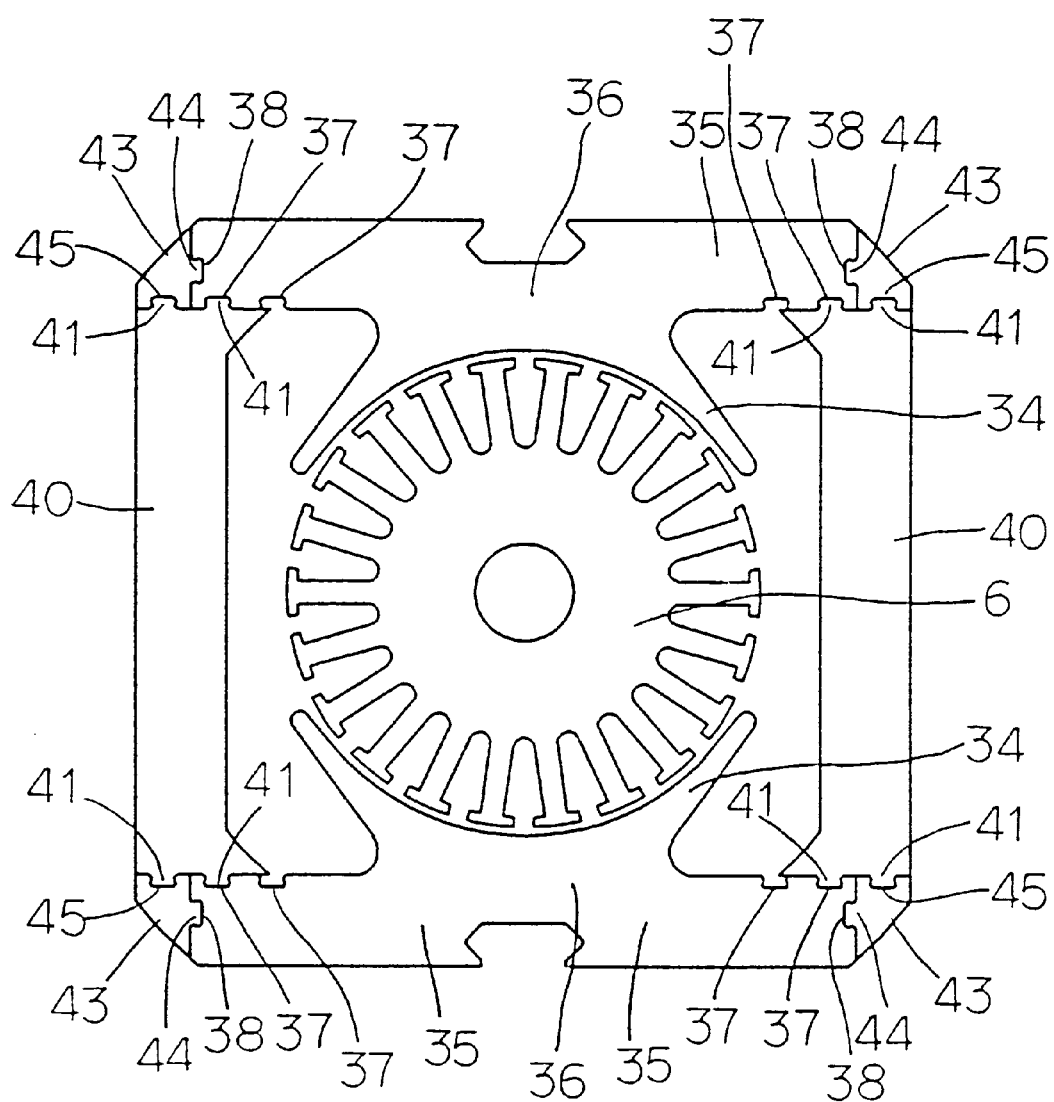
FIG. 11 is a sectional view showing a state in which the stator and the rotor are assembled.
Figure 12:
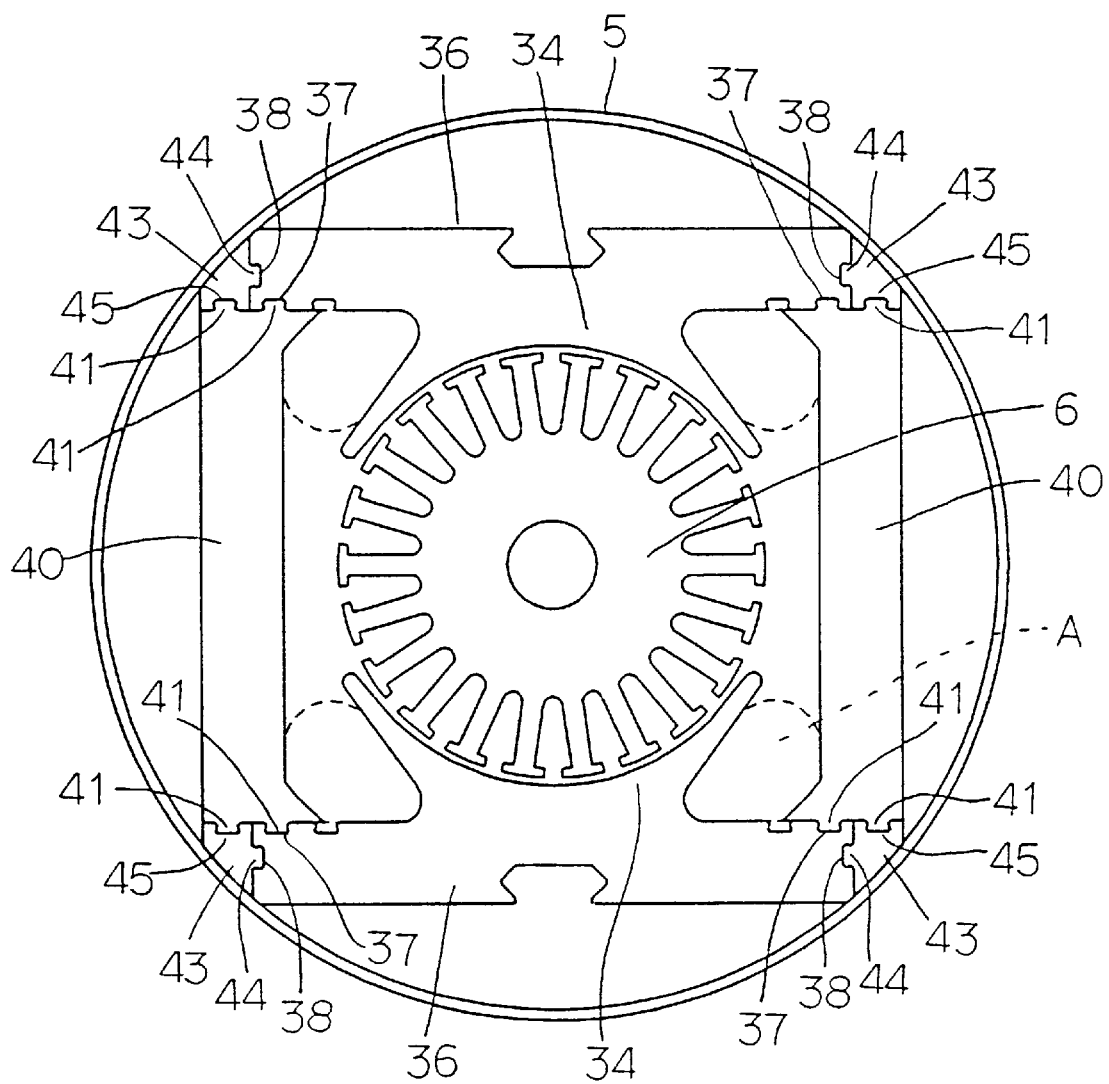
FIG. 12 is a sectional view showing a state in which the stator and the rotor are press fitted into a bracket.
Figure 13:
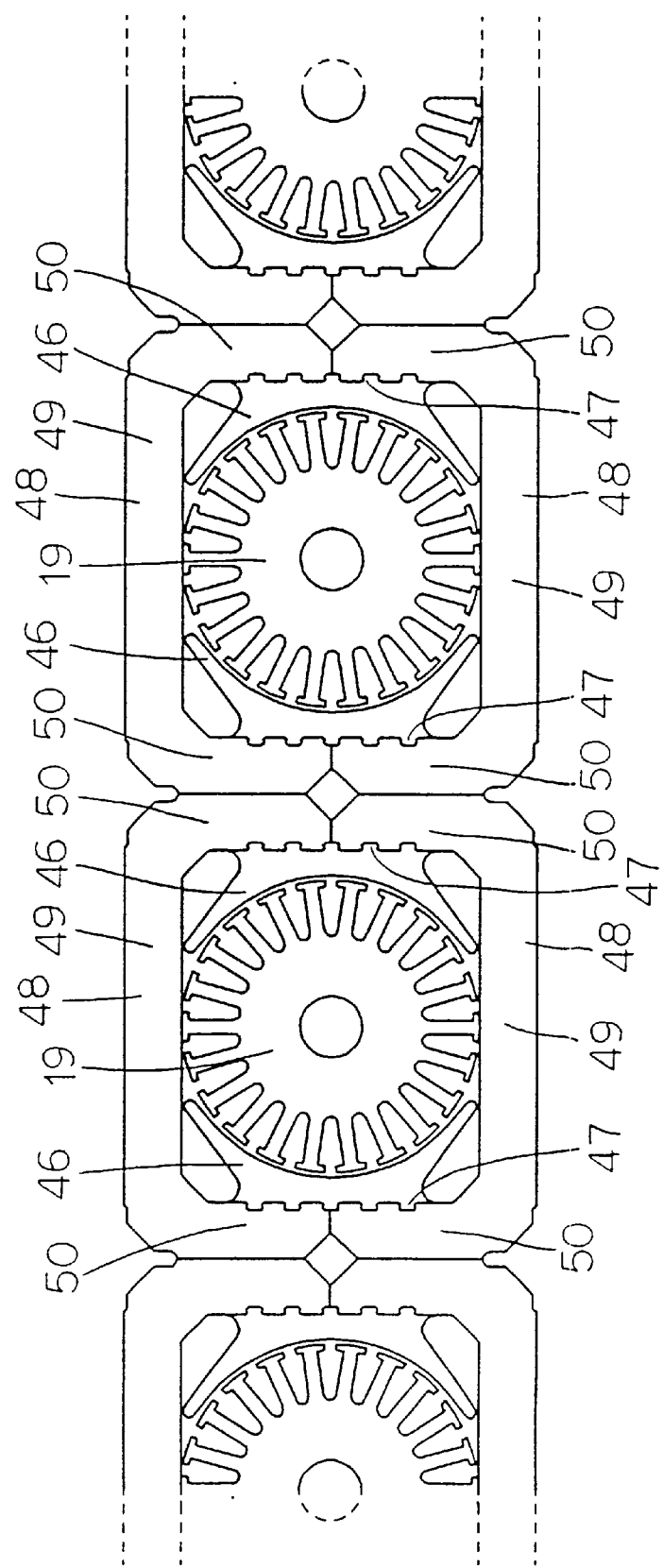
FIG. 13 is a view showing a press process of a stator and rotor material according to a fourth embodiment of the present invention.

Respective members are blanked in a sheet of steel plate in a state in which, as shown in FIGS. 9 and 10, the magnetic poles 34, 34 of the magnetic pole members 33, 33 are opposite to each other; the rotor member 19 is arranged between the magnetic poles 34, 34; and the yoke members 39, 39 are rotated by 90 degrees from the magnetic pole members 33, 33, and arranged between the mutually opposite arms 35, 35 of the magnetic pole members 33, 33 and at positions proximate to the rotor members 19; and at the same time, the joint member 42 is blanked between the magnetic pole 34 of the magnetic pole member 33 and the yoke core member 39. At this time, yoke core members 39, 39 and the rotor member 19 are located within a width H of the magnetic pole member 33.

The magnetic pole core 36, the yoke core 40, the joint core 43 and the rotor 6 are formed by laminating and fixing the magnetic pole members 33, the yoke core members 39, the joint members 42 and the rotor members 19 by the use of caulking technique and the like, respectively. The engaging projection 41 on the inner side of the yoke core 40 is press fitted into the recess 37 on the end side of the magnetic pole core 36 to fix the magnetic pole core 36 to the yoke core 40; and at the same time, the projection 44 of the joint core 43 is pressed into the recess 38 formed on the end face of the magnetic pole core 36 for fixation, and the engaging projection 41 on the outer side of the yoke core 40 is press fitted into the recess 45 of the joint core 43 fox fixation.

According to this constitution and assembling method, in blanking the component members for the stator 4 and the rotor 6 in a steel plate, the stator 4 can be formed by arranging all the component material within the width H of the magnetic pole member 33, and moving laminated members for the stator 4, that is, the magnetic pole core 3 6 and the yoke core 4 0 toward the end of the arm 35 of the magnetic pole member 36 to be connected to each other. Therefore, portions (corresponding to portions 63 of prior art) which heretofore have been discarded when stator material is blanked, that is, portions between rotor member and stator member can be effectively utilized to improve the yield of material, and at the same time, the divining of the stator allows the workability to wind windings on the magnetic poles 34 to be improved.

Although in the third embodiment, the joint members 42 as the third members are blanked in the same material as the rotor and stator, the joint members 42 might be blanked in another material. Further, the joint members 42 might be formed by a lower-magnetic reluctance material, for example, ferrite and the like.

Further, with reference to FIGS. 13 to 16, a fourth embodiment of the present invention will be explained. The same parts as those of the first embodiment are designated by the same reference numerals, and thus the explanation thereof will be omitted.

Reference numeral 46 designates a magnetic pole member as a first member on which windings are wound, and the magnetic pole member 46 is formed with a plurality of engaging projections 47 on the side non-opposite to the rotor member 19.

Reference numeral 48 designates a yoke member as a second member formed between the mutually opposite magnetic pole members 46, which has a body portion 49 composing a side perpendicular to the magnetic pole members 46 and an arm portion 50 extending from both ends of the body portion 49, and which is formed into a U-shape. Reference numeral 51 designates recesses formed on the portions opposite to the engaging projections 47 of the magnetic pole member 46, and the recesses 51 are designed to be engaged with the engaging projections 47 when the stator is assembled.

Figure 14:
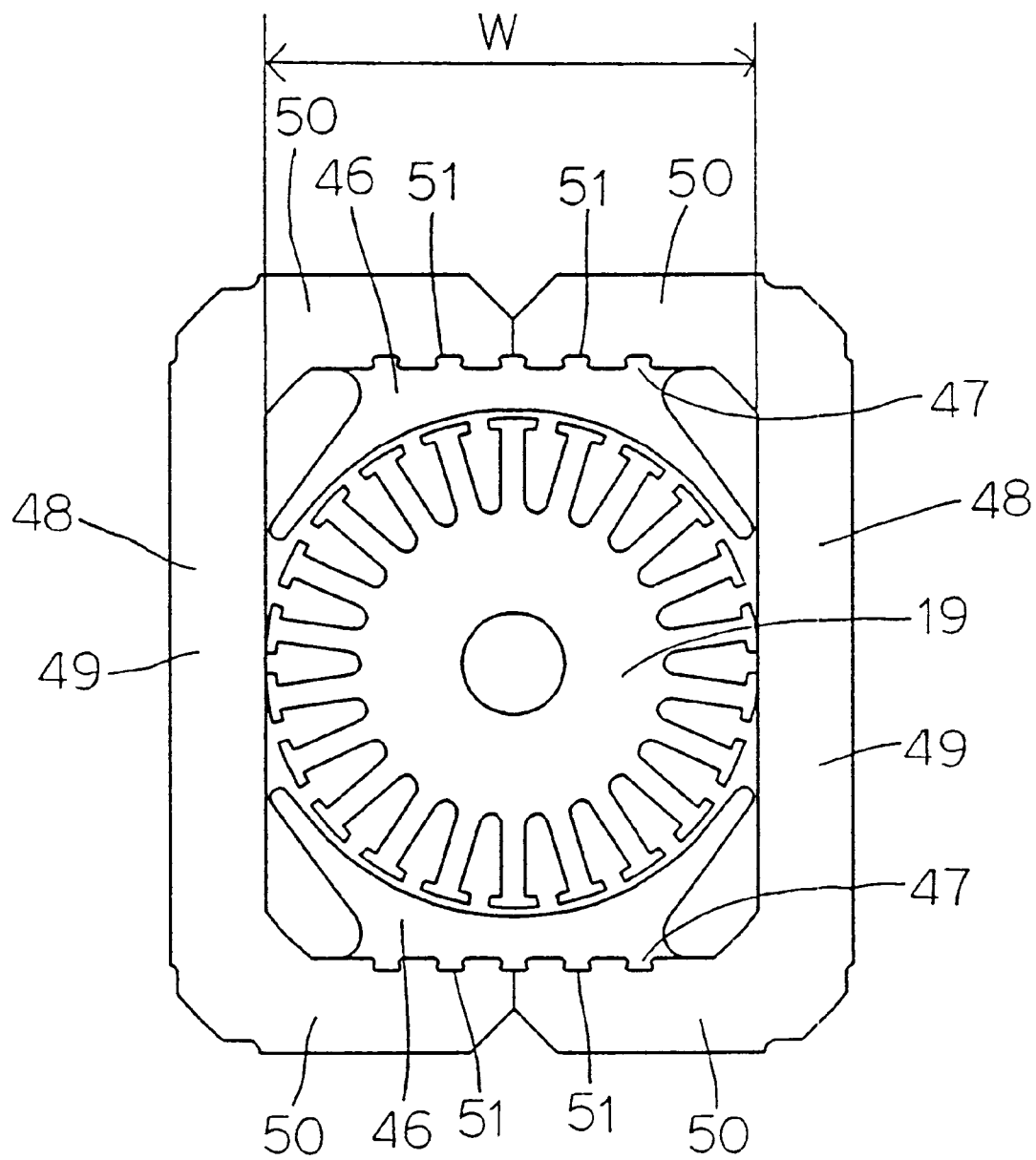
FIG. 14 is an enlarged view of a stator and rotor composing material in the press process of FIG. 13.
Figure 15:
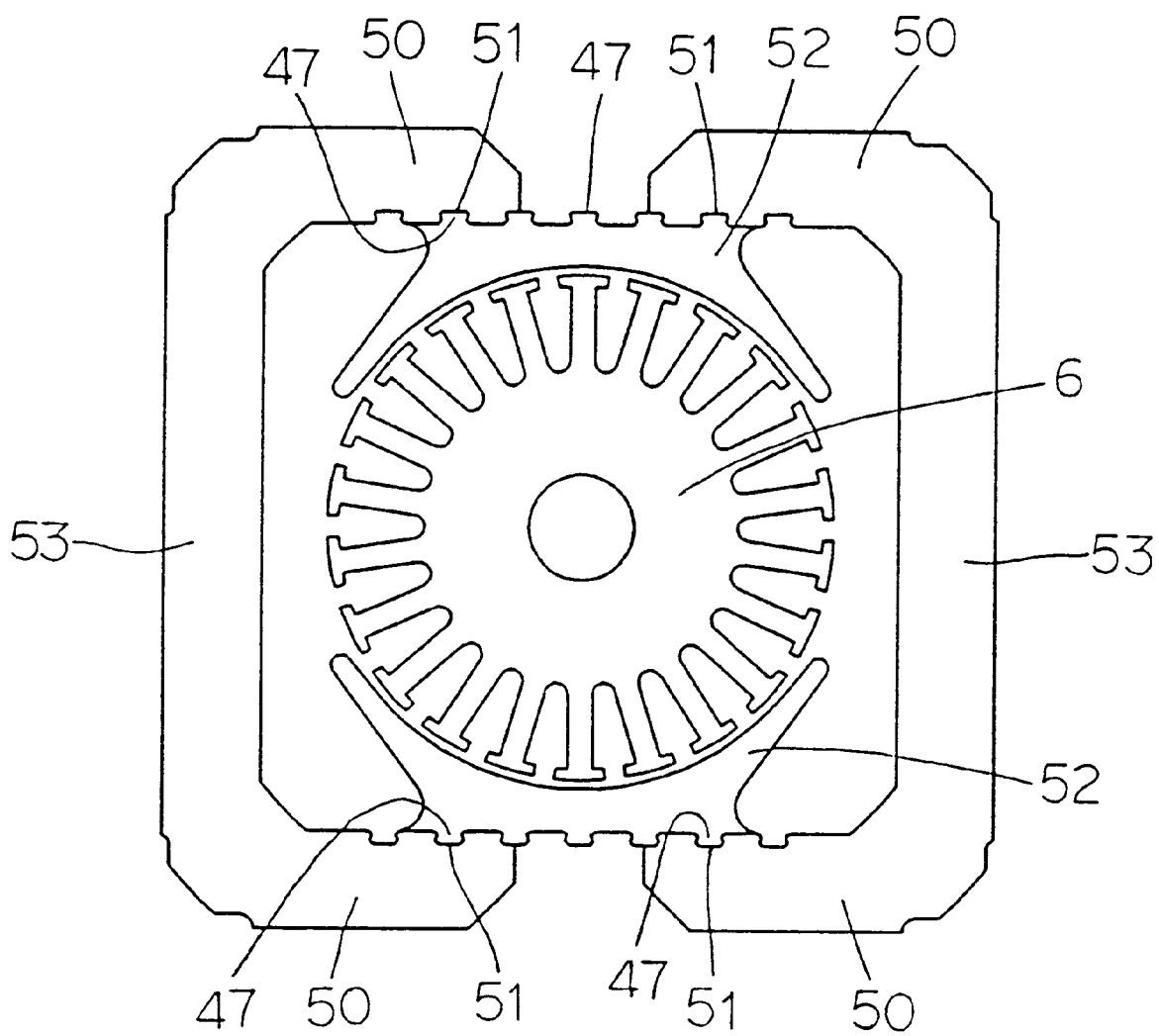
FIG. 15 is a sectional view showing a state in which the stator and the rotor are assembled.
Figure 16:
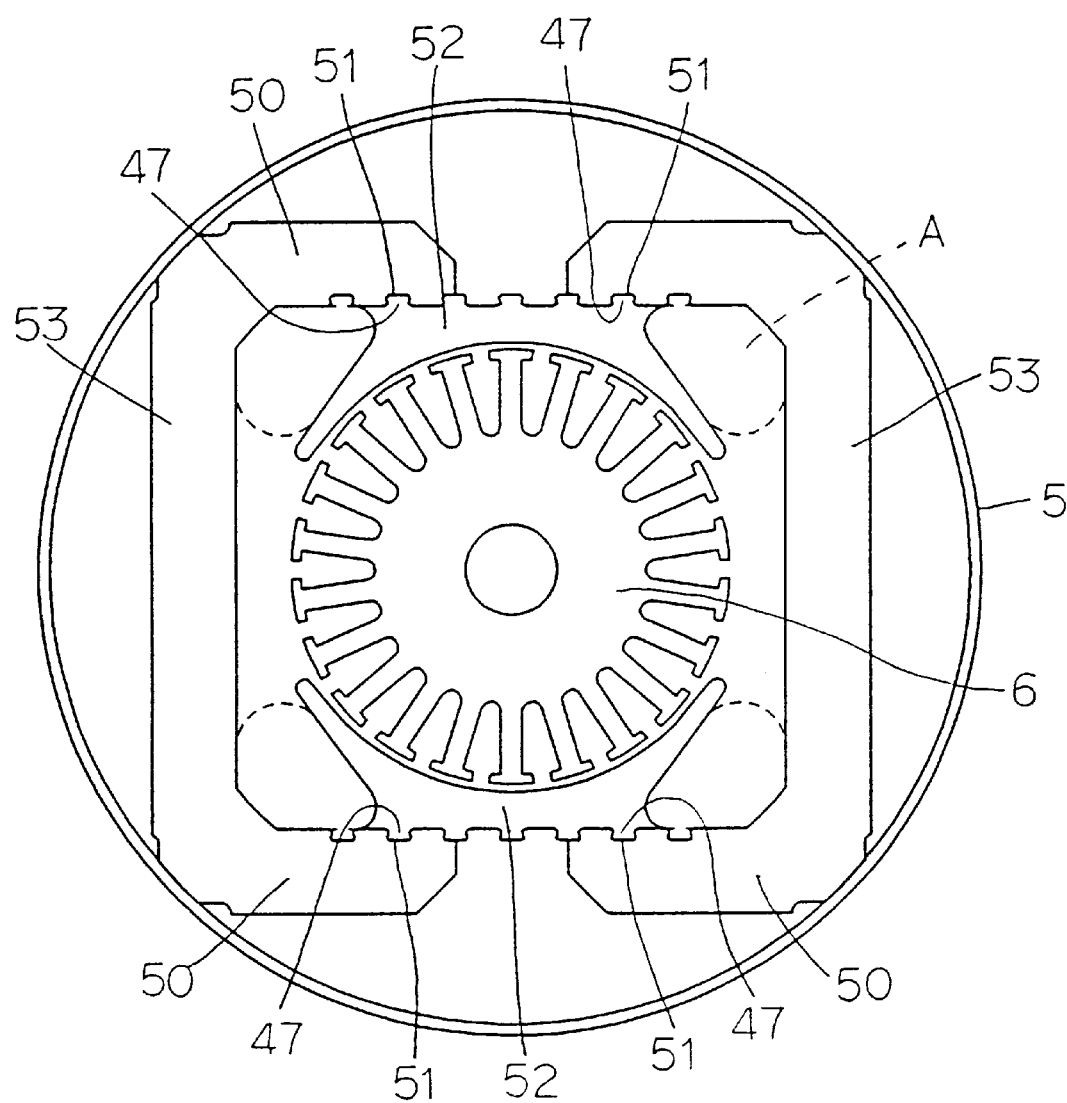
FIG. 16 is a sectional view showing a state in which the stator and the rotor are press fitted into a bracket.

Respective members are blanked in a sheet of steel plate in a state in which, as shown in FIG. 14, ends of the arm portion 50 of the U-shaped yoke members 48, 48 are made proximate to each other and arranged to form a rectangular shape; the magnetic pole members 46, 46 are arranged in a manner to bridge both ends of the yoke members 4 8, 48 inside the rectangular shape; and the rotor member 19 is arranged between the magnetic pole members 46, 46.

At this time, a dimension W between the body portions 49, 49 is set at a value substantially equal to the diameter of the rotor member 19 and the width dimension of the magnetic pole member 46 in a state where the ends of the arms 50 of the mutually opposite yoke members 48, 48 are made proximate to each other, and at the same time, in a state where the yoke members 48, 48 are arranged in opposite relationship.

The magnetic pole core 52, the yoke core 53 and the rotor 6 are formed by laminating and fixing the magnetic pole members 46, the yoke core members 48 and the rotor members 19 by the use of caulking technique and the like, respectively, and the stator 4 is composed by press fitting the recesses 51 formed on the end side of the arms 50 of the yoke core 53 into the end most engaging projections 47 among the engaging projections 47 of the magnetic pole core 52.

According to this constitution and assembling method, in blanking the component members for the stator 4 and the rotor 6 in a steel plate, the stator 4 can be formed by setting the dimension W between the body portions 49, 49 at a value substantially equal to the diameter of the rotor member 19 and the width dimension of the magnetic pole member 4 6, and by moving the yoke core 53 comprising laminated yoke core members 48 toward both sides of the magnetic pole core 52 comprising laminated magnetic pole members 46 to connect them. For this reason, portions (corresponding to portions 63 of prior art) which heretofore have been discarded when stator material is blanked, that is, portions between rotor member and stator member can be reduced, thereby improving the yield of material used.

Although in this embodiment, when members are blanked in a material, the ends of the arms 50, 50 of the yoke core members 48, 48 have been arranged in butted relationship, the ends might be arranged with a little space therebetween so long as the joining area of the arm 50 of the yoke core 53 with the magnetic pole core 52 does not become extremely small (that is, so long as the flow of magnetic flux is not prevented) when the yoke core 53 is moved to the end of the magnetic pole core 52 for fixation.

According to the constitution of claim 1 of the present invention, the dividing of the stator allows the workability to wind windings on the poles to be improved, and the blanking of the yoke cores within the width of the magnetic pole cores allows the yield of material to be improved, whereby reducing the cost. The forming of curve portions at both ends of the yoke cores allows the width of the magnetic pole core to be made small and the yield of material to be improved, and at the same time, a distance between the magnetic pole/yoke core and the rotor to be secured when the yoke core is connected to the end of the magnetic pole core, and thus a leakage in magnetic flux from the rotor to the yoke core to be prevented.

According to the constitution of claim 2 of the present invention, the dividing of the stator allows the workability to wind windings on the poles to be improved, and the stator can be formed by connecting the magnetic pole core through the link core to the yoke core which is longer than the magnetic pole core, thereby improving the yield of the stator material and reducing the cost.

According to the constitution of claim 3 of the present invention, the dividing of the stator allows the workability to wind windings on the poles to be improved, and the stator can be formed by connecting the yoke core, which is formed by being blanked in a material between the arms of the magnetic pole core, to the end of the arm and connecting the joint core between the end face of the magnetic pole core and that of the yoke core, whereby allowing the yield of material to be improved and the cost to be reduced.

According to the constitution of claim 4 of the present invention, the stator can be formed by blanking the magnetic pole cores in a state in which the magnetic pole core is disposed inside the rectangular shape formed by making the ends of the U-shaped yoke core proximate to each other and bridges the ends of the yoke core, and by moving the yoke core toward the end of the magnetic pole core to connect, thereby improving the yield of material and reducing the cost.

According to the first manufacturing method of the present invention, the dividing of the stator allows the workability to wind windings on the poles to be improved, and the stator can be formed by connecting the yoke core, which is formed by being blanked in a material between the arms of the magnetic pole core, to the end of the arm, thereby improving the yield of material and reducing the cost.

According to the second manufacturing method of the present invention, the dividing of the stator allows the workability to wind windings on the poles to be improved, and the stator can be formed by connecting the magnetic pole core through the link core to the yoke core which is longer than the magnetic pole core, thereby improving the yield of the stator material and reducing the cost.

According to the third manufacturing method of the present invention, the dividing of the stator allows the workability to wind windings on the poles to be improved, the stator can be formed by connecting the magnetic pole core through the link core to the yoke core which is longer than the magnetic pole core, and the blanking of the link members forming the link cores between the first member forming the magnetic pole core and the second member forming the yoke core allows the yield of the stator material to be further improved and the cost to be reduced.

According to the fourth manufacturing method of the present invention, the dividing of the stator allows the workability to wind windings on the poles to be improved, and the stator can be formed by connecting the yoke core, which is formed by being blanked in a material between the arms of the magnetic pole core, to the end of the arm, and by connecting the joint core between the end face of the magnetic pole core and that of the yoke core allows the yield of material to be improved and the cost to be reduced.

According to the fifth manufacturing method of the present invention, the dividing of the stator allows the workability to wind windings on the poles to be improved, and the stator can be formed by connecting the yoke core, which is formed by being blanked in a material between the arms of the magnetic pole core, to the end of the arm, and by connecting the joint core between the end face of the magnetic pole core and that of the yoke core. Further, the blanking of the third members forming the joint cores between the first member forming the magnetic pole core and the second member forming the yoke core allows the yield of material to be further improved and the cost to be reduced.

According to the sixth manufacturing method of the present invention, the stator can be formed by blanking respective members in a state in which the magnetic pole core is disposed inside the rectangular shape formed by making the ends of the pair of U-shaped yoke cores proximate to each other with bridging the ends of the yoke core, and in which the rotor member is disposed between the magnetic pole members, by laminating these members respectively to form the yoke core, the magnetic pole core and the rotor, and by moving the yoke core to both ends of the magnetic pole core to connect, thereby improving the yield of material and reducing the cost.

Though several embodiments of the present invention are described above, it is to be understood that the present invention is not limited only to the above-mentioned and various changes and modifications may be made in the invention without departing from the spirit and scope thereof.

What is claimed is:

1. A motor with a stator and a rotor in which the stator includes a plurality of divided members, comprising:

a pair of magnetic pole cores having poles composed of two mutually opposite sides of the stator and arms extending in both directions from the poles, wherein the poles are wound with windings, and wherein each of the magnetic pole cores comprises laminated, plural magnetic pole members; and yoke cores arranged between mutually opposite arms of the magnetic pole cores, wherein both ends of the yoke cores include curved portions, each of said arms having engaging parts, wherein a location of a portion of the engaging parts is adjustable between outside a respective periphery of the yoke cores and inside a respective periphery of the yoke cores, and wherein each of the yoke cores comprises laminated, plural yoke members, wherein the curved portions extend alongside the poles wound with windings, and wherein the curved portions are coupled proximate to the arms of the magnetic pole cores, the yoke members being adjustable such that the yoke members are positioned within substantially the same width as that of the pair of magnetic pole members when blanking a material and the yoke cores are moved outward when arranging each core for the stator after laminating the blanked material.

2. A motor with a stator and a rotor in which the stator includes a plurality of divided members, comprising:

a pair of magnetic pole cores having poles composed of two mutually opposite sides of the stator, wherein the poles are wound with windings, and wherein each of the magnetic pole cores comprises laminated, plural magnetic pole members;

a pair of yoke cores longer than the magnetic pole cores, wherein respective portions of the pair of yoke cores extend alongside the poles wound with windings and wherein each of the yoke cores comprises laminated, plural yoke members; and link cores, each comprising laminated, plural link members which are adjustable such that the link members are positioned between the yoke members and the magnetic pole members when blanking a material and the link cores are positioned between ends of the yoke cores and ends of the magnetic pole cores when arranging each core for the stator after laminating the blanked material.

3. A motor with a stat or and a rotor in which the stator includes a plurality of divided members, comprising:

a pair of magnetic pole cores having poles composed of two mutually opposite sides of the stator and arms extending in both directions from the poles, wherein the poles are wound with windings, each of the magnetic pole cores having end faces, and wherein each of the magnetic pole cores comprises laminated, plural magnetic pole members;

yoke cores arranged between mutually opposite arms of the magnetic pole cores, each of the yoke cores having end faces and wherein each of the yoke cores comprises laminated, plural yoke members; and joint cores, each comprising laminated, plural joint members which are adjustable such that the joint members are positioned between the yoke members and the magnetic pole members when blanking a material and the joint cores are positioned between ends of the yoke cores and ends of the magnetic pole cores when arranging each core for the stator after laminating the blanked material.

4. A motor with a stator and a rotor in which the stator includes a plurality of divided members, comprising:

a pair of substantially U-shaped yoke cores composed of the stator, the yoke cores having inner sides, and wherein each of the yoke cores comprises laminated, plural yoke members; and magnetic pole cores having engaging portions extending toward the inner sides of ends of the yoke cores, wherein each of the magnetic pole cores comprises laminated, plural magnetic pole members, the ends of the yoke members being adjustable such that the ends of the yoke members are positioned at a central portion of the magnetic pole members when blanking a material and the ends of the yoke cores are positioned at ends of the magnetic pole cores when arranging each core for the stator after laminating the blanked material.

* * * * *